Jan. 31, 1967 J. H. TODT 3,301,948

FACSIMILE APPARATUS

Filed Sept. 11, 1963 3 Sheets-Sheet 1

INVENTOR.
JOACHIM H. TODT
BY
Schroeder & Siegfried
ATTORNEYS

Jan. 31, 1967 J. H. TODT 3,301,948

FACSIMILE APPARATUS

Filed Sept. 11, 1963 3 Sheets-Sheet 2

INVENTOR.
JOACHIM H. TODT
BY
Schroeder & Siegfried
ATTORNEYS

FACSIMILE APPARATUS

Filed Sept. 11, 1963

INVENTOR.

JOACHIM H. TODT

BY

Schroeder & Siegfried

ATTORNEYS

United States Patent Office 3,301,948

Patented Jan. 31, 1967

3,301,948
FACSIMILE APPARATUS

Joachim H. Todt, 5801 Rolling Hills Road, Fort Wayne, Ind. 46804

Filed Sept. 11, 1963, Ser. No. 308,227
11 Claims. (Cl. 178—6.6)

This invention relates to the field of copying machines and more particularly to those machines which reproduce images of any kind appearing on paper or the like by methods of facsimile using magnetic principles and being capable of reproducing such images at a local or remote station.

Presently known copying machines generally have particular disadvantages. Some of the more common types of machines use sensitized paper which must be developed by wet chemicals. That is, the image to be reproduced is conveyed to a sensitized paper by passing light through the sensitized paper and reflecting it from the image to be copied. This paper is then joined with another paper in a solution and the image is transferred by passing the papers through the solution and pressing them together. Thus, in this process, there is always one sheet of paper which is thrown away or destroyed and is of no further value since it forms the "negative" portion of the copying process which is similar to photography.

Another type of process uses heat for transferring the image to a heat sensitive copying paper and generally the paper upon which the image is transferred is further effected by heat and thus the image is partially or totally destroyed if inadvertently subjected to higher temperatures. Furthermore, such heat sensitive papers generally do not reproduce all colors which results in improper gray, black and white combinations or tones to form an inferior copy.

There are also other copying processes using electrostatic principles in which high voltages are applied to certain parts of the machine. Some of the devices use a sensitized paper which again has disadvantages just described or they may be of the type which uses ordinary paper to transfer the image by an electro-static process where the process is somewhat slow and is relatively expensive.

While some attempts have been made to use magnetic principles for recreating an image, they have generally been limited to the type of device where only one "writing head" is used with the net result that along scanning period of time is needed to scan the original image to be copied.

My invention contemplates the use of well established magnetic principles by "writing" a magnetic track with a "whisker" which may be generally referred to as a stylus formed of high permeable magnetic material on a surface of high retentive magnetic material such as certain iron oxides used in magnetic tapes or more particularly cobalt alloys in comparatively thin layers or thin sandwiched layers.

The magnetic tracks just referred to can be made visable by dusting the tracks with a powder of magnetic material having small particles size and which will generally be referred to as "dust," the dust being generally well known.

Once the magnetic particles have adhered to the magnetized portions of the "recording medium," they can be transferred by pressing any suitable common paper against the recording medium to transfer the image. In some instances, it may be desirable to fuse or melt a thin layer of wax or plastic or other material which is coated on the transfer medium, so that upon application of heat, the magnetic particles will adhere to the transfer medium and thus the pressure required to transfer such an image may be reduced. Of course it is also possible that both heat and pressure may be used in transferring the image from the recording medium to the transfer medium or paper.

Most of the attempts at producing images by using magnetic principles were directed to a recording head of the ring or horseshoe type which produced a pole-pair track on the recording medium and the results of using such a magnetic recording head have generally proved to be unsatisfactory because of the double track produced. It has been determined, however, that the magnetization gradient produced in the recording medium is sufficient to produce a proper magnetic track and to attract the magnetic dust and this principle is employed in the present invention. That is, a single track is employed whereas before results have generally been directed to a system in which a pair of poles produced a pair of tracks and thus the resolution of the copied image was very poor. Moreover, it has been found that there is little difference in the final result obtained regardless of whether the recording medium is in a neutral or unmagnetized state or whether the recording medium is in a magnetic state and saturated in a north or south oriented pattern. As will be described later in more detail, by referring to the drawings, gradient tracks produced by a multiple stylus or whisker "recording head" constitute the mechanism for generating a picture of photographic resolution, which may exceed 40 line pairs per millimeter. In the use of the present invention, it is necessary to provide the same number of transmission lines as there are sensing elements, however, the facsimiles produced by the invention show fine photographic details in which the grain of magnetic particles surpasses photographic silverbromide grain because the magnetic particles are of uniform size as opposed to the irregular size of the silverbromide grains.

In some instances it is more practical to use a single sensor and provide a scanning means as in the situation where a TV camera is used and the scanning is done with an image orthicon tube. In this situation, the signal must be distributed properly to the correct stylii and this may be accomplished by using a delay line of the proper design.

In each of the particular applications contemplated, the outstanding feature of the invention is the extremely short time needed to "dust" the recording medium and thus transfer the image to the paper, the time being in the order of one or two seconds.

It is also contemplated that in certain applications, it may be desirable to show the facsimile to a group of viewers at one time which makes it important that the apparatus be usable with an image projection system. The projection system may be accomplished by several means. One such possibility is to transfer the "dust" picture onto a transparent paper, film, or glass, and project it with a common projector. Another means of projecting the image is by reflecting the projection from the dusted recording medium which exhibits a very visable light reflection quality. Another method of projecting the image is by writing magnetically, the image, onto a master-type recording medium which is in essence, an 85–90% optically transmitting film with approximately 10% magnetic recording media which allows the projection instantly after dusting the medium and saves the transfer time which is otherwise generally required.

It is therefore a general object of the present invention to provide an improvement in the field of facsimile copying and printing.

It is still another object of this invention to provide a facsimile printing system using a magnetic recording medium and magnetic particles of minute size for creating the visible image.

It is another object of this invention to provide a plurality of writing whiskers or stylii, particularly in a copying machine.

It is another object of this invention to provide a multiple recording stylii arrangement where each stylus has a large magnetic return path.

It is still another object of this invention to provide copying apparatus using a magnetic gradient recording track for the attraction of minute magnetic particles.

It is still a further object of this invention to provide a multiple fiber optic photo-electric sensor.

It is yet another object of this invention to provide a projection display of fascimile type pictures by reflection projection.

It is yet another object of this invention to provide projection of pictures by use of a magnetic recording medium which is substantially transparent.

It is yet another object of this invention to provide a low abrasion recording medium printing drum using multiple layers of high retentive magnetic material.

These and other objects and advantages of my invention will more fully appear from the following description, made in connection with the accompanying drawings, wherein like reference characters refer to the same or similar parts throughout the several views, and in which.

Figure 1:
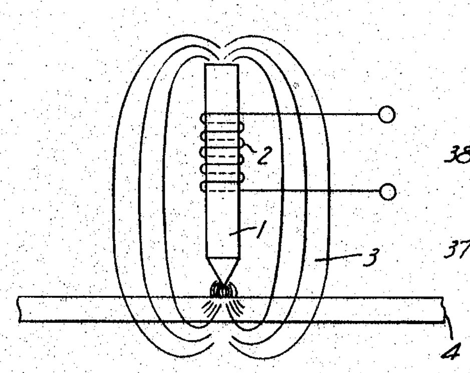
FIG. 1 is a diagram showing a single stylus with a coil and its associated magnetic flux pattern.

The general principle of operation of this invention can best be seen by describing the operation of the writing stylus 1 as found in FIG. 1. The stylus is made from a highly permeable magnetic material such as a Nickle-Iron-Cobalt alloy known as "Mo-Permalloy" or any other suitable material. The stylus is in the form of an elongnated rod which has a diameter on the order of one thousandth (0.001) of an inch. The end of the stylus is drawn to a point to concentrate the magnetic lines of flux. Around the stylus, is wound a coil 2 which when energized, magnetizes the stylus in accordance with the magnitude of the light values of the original image which is to be reproduced and this will be further set out and described later. In actual design, the coil 2 may contain only a single turn rather than being a multiple turn coil. Upon magnetic excitation of the stylus through applying an electrical signal to coil 2, a flux pattern 3 is generated which of course is more dense at the tip of the stylus because of the reduced area or point at the end of the stylus. The magnetic return path goes through the air or neighboring stylii and through a large area of a recording medium 4 which is shown as a broken portion of the medium. It has been found that there is very little residual magnetism returning in medium 4 to create any disturbance when recording medium 4 is moved substantially perpendicular to the axis of the stylus 1 and is moved in synchronism with the original document to be copied.

Figures 2, 12, 13:
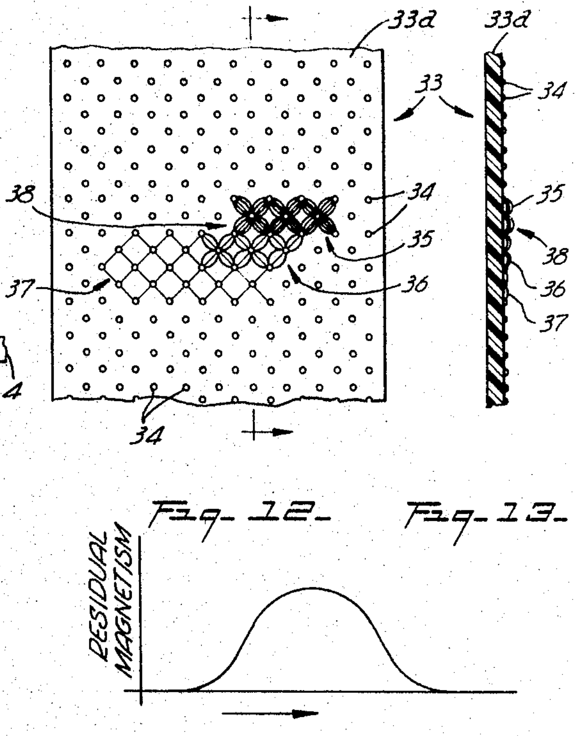
FIG. 2 is a diagram illustrating the flux distribution produced on the recording medium.
FIG. 12 is a diagrammatic sectional view of a "magnetic tape" with approximately 90% optical transmission and 10% magnetic retentive surface on which certain areas have been magnetized and dusted.
FIG. 13 is a side elevational view of the same "magnetic tape" as seen in FIG. 12.

In FIG. 2, the residual magnetism found in medium 4 is graphically illustrated as a function of speed as it would appear on a recording instrument when the magnetic field is plotted as a function of constant speed.

Figure 3:
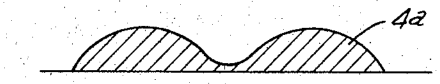
FIG. 3 is an illustration showing a cross section of a resulting dust track caused by over exposure.

After the residual magnetic field has been established in the medium, the distribution of a magnetic powder or dust 4*a* will produce a certain visual image and have a definite cross sectional pattern for a proper distribution. As shown in FIG. 3, where the powder or dust 4*a* has been brought into contact with the recording medium, the pattern is distorted and has been found to be caused by an excessive magnetic excitation in the stylus 1.

Figure 4:
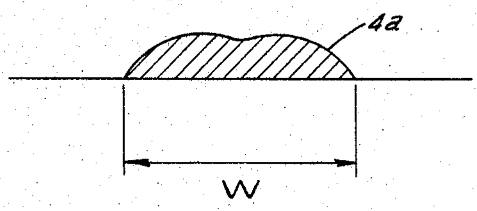
FIG. 4 is an illustration showing the same cross section of the resulting dust track when exposed properly.

A proper distribution of the dust is shown in cross section in FIG. 4 where a normal or optimum valve of magnetic excitation has been used. A typical value for the width of the track "W" as seen in FIG. 4, is approximately three thousandths (0.003) of an inch for use in office copying machines and the track would generally be several ten thousandths of an inch if used for projection purposes or for microfilm records.

In order to produce the proper visable track upon the magnetic medium, the fine magnetic particles, described as dust heretofore, can be made of three micron diameter carbonyl iron which has been oxidized at temperatures of approximately 300 degrees centigrade (300° C.) to yield a deep blue color which produces a closely resembled black "ink" upon the transfer medium or copy. By using an oxidized material, the dust is prevented from having formed on the minute particles, other unwanted oxidization. Because the particles are oxidized, they also have less tendency to become attracted to each other and become lumpy in nature. Moreover, it was found that this oxide layer improves the picture quality by suppressing background "noise" in the preparation of the image. For certain applications, it may also be desirable to suspend the dust in a liquid where the recording medium would then be passed through the solution. It has been found that suspension in a liquid generally yields superior quality reproduction of the images being copied.

Figure 5:
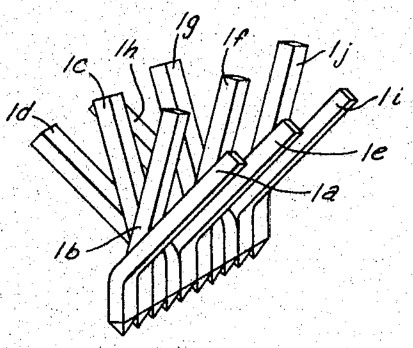
FIG. 5 is an illustrative view showing the principle arrangement of staggered stylii with the coils omitted.

In a perspective view, one of many possible arrangements of a plurality of stylii 1*a* through 1*j* is shown in FIG. 5 positioned in such a manner as to make room for the associated coils which have been omitted for clarity. It will be observed that the stylii are arranged so that the pointed ends and the substantial portion of the body of each stylii is aligned in a row with each stylus disposed adjacent to the other. In practice, approximately 1,000 to 1,500 stylii are arranged in a row to produce the desired high quality of resolution and reproduction of normal documents and it is important that their points be aligned in a straight line. As many as 2,000 to 2,500 stylii are contemplated for use where special applications require the display of particular images. Each of the stylii such as stylii 1*a* through 1*d* have coils to superimpose thereon. The coils are connected by a common conductor 5 and excitation is applied between the common conductor 5 and excitation conductors 6*a* through 6*d*. It is obvious that the other coils connected to any of the stylii may have a common conductor and the other ends of the coil would have the energizing voltage applied thereto to create the proper magnetic field about the stylii. It should be noted particularly that with this form of stylii, that the magnetic field created in the medium 4 is dependent upon the amount of current supplied by the coils 2 and therefore, when the signal appearing on the excitation winding is of small magnitude, the magnetic field decreases and when the signal is of large magnitude, the magnetic field is increased.

Figures 7, 8, 9, 11:
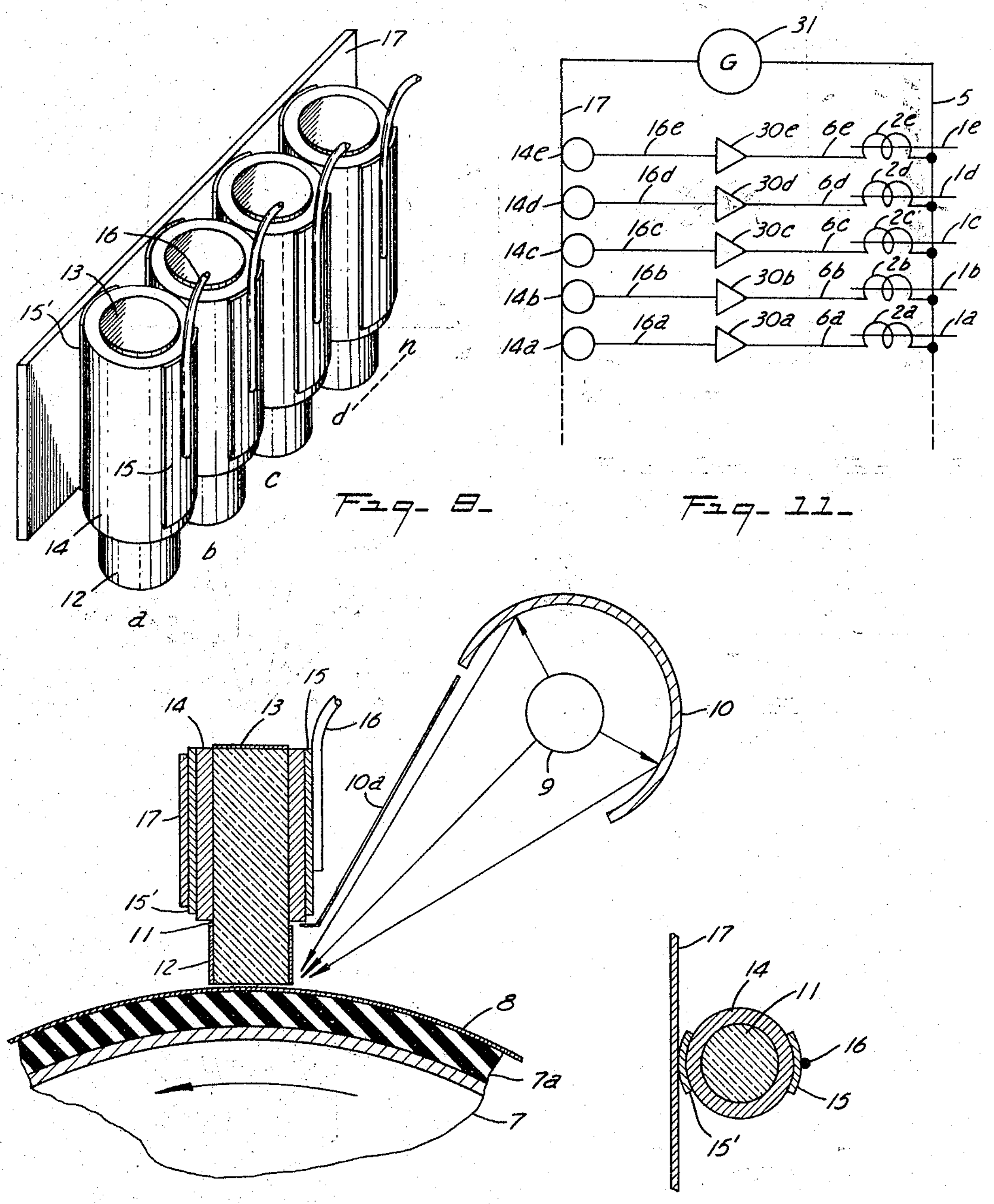
FIG. 7 is a partial cross-sectional view of the read-arrangement of a copying machine as seen from the side using photosensitive glass fibers and a light source.
FIG. 8 is a top view of a single photosensitive glass fiber as seen in FIG. 7, with the end mirror removed.
FIG. 9 is a partial section of the line of photosensitive glass fibers of the copending apparatus.
FIG. 11 is a schematic diagram of electrical circuit of a copying machine.

The copying portion of the apparatus is best in FIG. 7 where a side elevational cross-section view is shown. The apparatus is formed by having a pressure roller 7 which is rotatably mounted (not shown) and may have an outer covering formed of some resilient material such as a rubber coating 7*a*. A smooth surface medium 8 which carries the image which is to be duplicated passes between the end of a glass fiber 11 and the coating 7*a* on roller 7. In other words, the resilient material 7*a* constantly urges the smooth surface medium such as paper, against the end of the fiber optic 11. In order that the fiber optic 11 may "see" the image on paper 8, a light source 9 has its light rays reflected by a reflector 10 onto the paper 8 where the light is focused on the paper in an area adjacent the end of the fiber optic 11. Of course it will be understood that the lamp may be of any type and where a number of fiber optic elements such as found in FIG. 9 are used, a fluorescent lamp may be used or any other suitable elongated illuminating source. A reflective coating 12 is formed on the outer surface of fiber optic element 11 adjacent the end which communicates with the image bearing medium 8 and a reflective coating 13 is formed on the end of the fiber optic element most remote from the image bearing medium 8. These reflective coatings may be plated or deposited on the fiber optic element in any suitable manner. A photoresistive coating 14 is formed on the outer surface of the fiber optic element and is spaced from the reflective coating 12. In other words, the sleeve of photoresistive material is formed on the upper portion of the fiber optic element 11. A pair of electrodes 15 and 15' are attached to the outer periphery of the photoresistive coating 14 and are diametrically opposed to each other. The electrode 15 is connected to a conductor 16 to transmit the electrical signal which appears between electrodes 15 and 15'. Electrode 15' is connected to a common conductor 17 which connects all of the electrodes which are formed on the same side of the photoresistive coating 14. Used in conjunction with reflector 10, is a shield 10*a* which is used to shield the light rays from the fiber optic element in the reproduced image. The signals representing the various shades or tones of the image are then produced by the light impinging upon the smooth surface medium 8 and being detected by the fiber optic element 11 where the difference in voltage appears across the electrodes 15 and 15' thus producing a potential difference between conductors 16 and 17 for each of the fiber optic elements.

FIGS. 8 and 9 present other views of the fiber optic element and its multiple use in a copying machine. It should be readily understood that FIG. 9 shows the arrangement of the fiber optic elements and their associated component parts when arranged in a row for scanning a medium bearing image which is to be reproduced. The different elements are designated *a, b, c, d . . . n*, to designate that the number of units to be used is dependent upon the resolution required and the width of the documents which are to be scanned.

Figure 6:
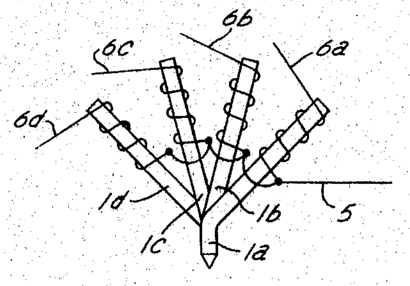
FIG. 6 is a diagrammatic view as seen from the side of a series of stylii each having a coil formed thereon.
Figure 10:
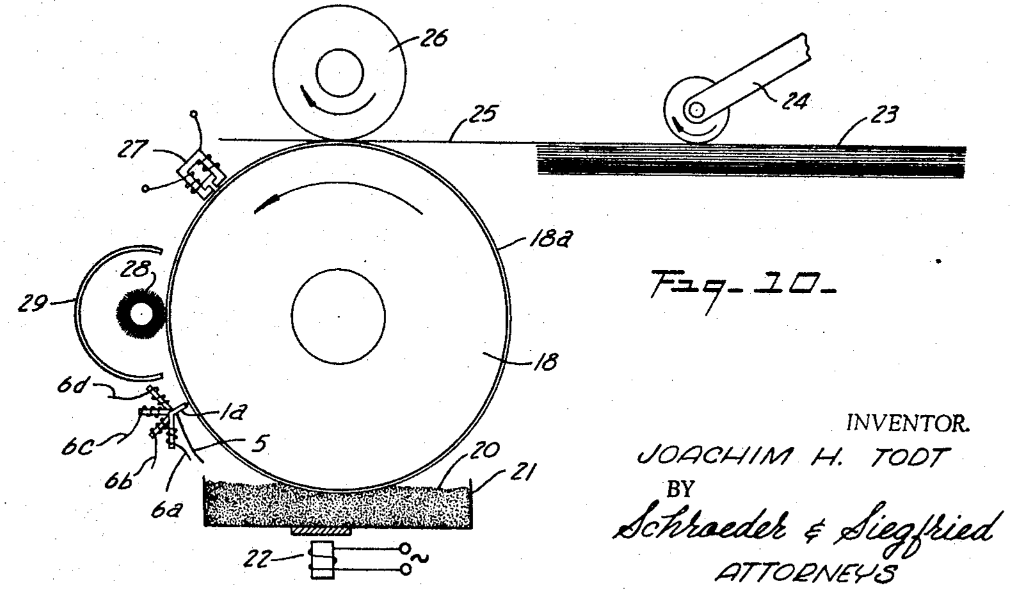
FIG. 10 is a diagram as seen from the side of the printing section of a copying machine.

In the diagrammatic view shown in FIG. 10, the printing mechanism of the copying machine is shown in more detail. The copying portion comprises a drum 18 which is rotatably supported for rotation and has an outer layer 18*a* which has a homogeneous magnetic recording surface of high rententive magnetic material coated or plated thereon for receiving and retaining a plurality of magnetic tracks. The writing stylii 1*a* through 1*d* are shown and are formed in the same manner as shown in FIGS. 5 and 6, it being understood that a number of the stylii would be positioned adjacent each other in a row transverse to the direction of motion of drum 18. The electrical connections 6*a* through 6*d* are also shown along with the common conductor 5. It will be noted specifically that the stylii are aligned radially with respect to the drum and disposed in a row transverse thereto in spaced relation from the drum to form an air gap and produce a corresponding number of magnetic tracks in the magnetic recording medium 18*a* of drum 18. A dust container 21 in a shape of a pan or similar container is used to contain a fine dust or powder 20 which may be of the type described earlier as the iron particles which have been oxidized. It will also be recognized that for some applications, it may be desirable to suspend the dust particles 20 in a liquid solution. An agitator 22 which is shown generally as an electromagnet connected to an alternating source of voltage, acts upon a metal block or piece of material connected to container 21 to cause the container to vibrate and thus keep the particles moving to prevent lumping of the material. Upon the particles adhering to the latent image on the drum, a visable image is produced.

A paper supply 23 provides a transfer medium upon which the image to be reproduced is superimposed and a single sheet of the paper 25 is moved into the communication with the magnetic recording surface 18*a* by a paper feeder 24 which is of any standard design to cause the paper to move in a linear motion. The paper or transfer medium 25 passes between drum 18 with the magnetic recording surface 18*a* formed at its outer edge and a pressure roller 26 which is mounted for rotational movement and constantly urges the paper 25 into communicating with relationship with the magnetic recording surface or medium 18*a*. As the paper 25 passes between the two elements just described, the image is reproduced on the transfer medium 25 and if it is desirable that additional copies be reproduced, the magnetic recording medium picks up additional dust particles as the drum passes through the particles 20 and a new image is created on another sheet of paper from the paper supply 23. If it is desirable that the image be erased, an erase head 27 is employed which may be a series of conventional magnetic recording erase heads or may be of a particular elongated type which extends transverse to the width of the drum 18. Erase head 27 is generally energized by an alternating voltage to wipe out any magnetic field created by the stylii 1. Where the erasing function takes place, and the magnetic field is erased, the dust or ferric oxide particles become loosened on the magnetic recording surface 18*a* of drum 18 and a rotary brush 28 brushes against the outside surface of the drum to remove the particles which may be collected and returned to container 21. A guard 29 is employed around brush 28 to keep the dust particles confined to a small area and thus produce a clean image by eliminating residual dust on the magnetic recording surface.

A schematic diagram of the facsimile or copying device is shown generally in FIG. 11 where the common conductor 5 is connected to a number of coils 2*a*, 2*b*, etc. which are formed on the stylii 1. Conductor 5 is connected to a direct current generator for power source 31 and the other terminal of the power source is connected to common conductor 17 which is connected to one electrode of each of the fiber optics employing photoresistive elements 14*a*, 14*b*, 14*c*, etc. Connected between each of the photoresistive elements and the writing stylii are a plurality of amplifiers 30*a*, 30*b*, etc. It should also be recognized that for some applications, sufficient current may be produced by the photo-resistive materials to provide adequate current for driving the stylii and producing the necessary image on the magnetic recording surface 18*a*.

Figure 14:
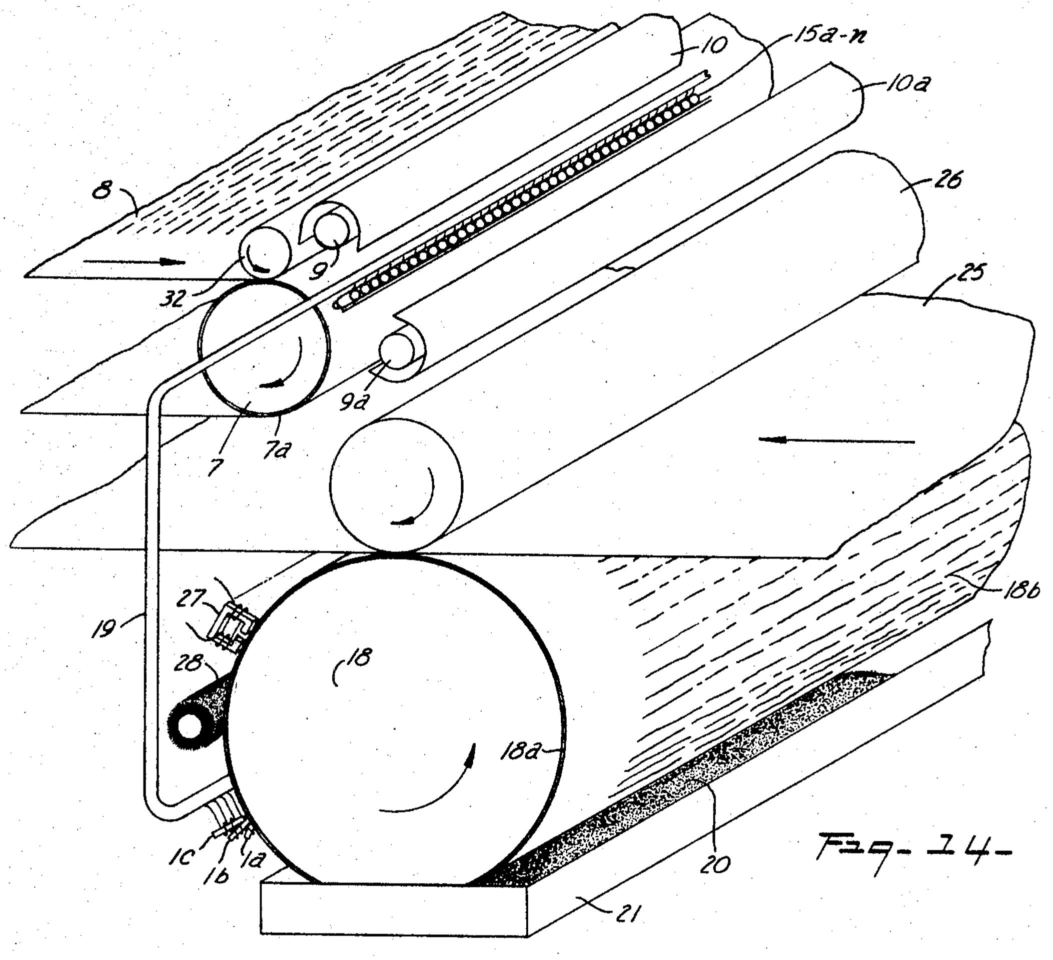
FIG. 14 is a diagrammatic view of a copying machine which generally combines the structures found in FIGS. 7 and 10.

In FIG. 14, a diagramatic representation of the copying apparatus is shown. For the particular structure shown and described, it will be seen that the document 8 which is to be copied is placed between a pressure roller 32 and pressure roller 7 where the paper or document is moved past a row of fiber optics which is designated generally as 15*a–n* which are connected in the manner shown in FIGS. 9 and 11 through an electrical cable 19. It will of course be understood that cable 19 may be connected to amplifying devices as shown in FIG. 11 if the current needed to drive the stylii is not sufficient. For this particular embodiment, a pair of lamps 9 and 9*a* and shields 10 and 10*a* are employed to provide sufficient lighting at the area where the fiber optics are used to detect image on document 8. The signals provided by the fiber optics are conducted to the stylii 1*a–n* where the same number of stylii are employed as there are individual fiber optic elements. Each of the stylii produces a track upon drum 18 in such a manner that the image is produced on the magnetic recording surface 18*a* and is shown as a pattern 18*b* on the outer surface of the drum. The image is produced by the dust 20 adhering to the outer surface of the drum as the dust is attracted by the magnetic field created in the magnetic recording material. A transfer medium sheet 25 such as a sheet of paper is passed between drum 18 and a pressure roller 26 so that an image is produced on the under side of sheet 25 as seen in FIG. 14. As explained earlier, if a number of copies are desired, then additional sheets may be fed between rollers 26 and 18 to produce multiple copies. Where it is desirable to erase the image, an electrical current is applied to an erasing head 27 which may be made up of a number of heads or a continuous head to remove the magnetic tracks from the drum and brush 28 then sweeps the iron oxide clear from the surface of the drum. It should also be evident that by increasing the spacing between the stylii, that the image reproduced can be enlarged upon the transfer medium 25 and by decreasing the spacing between the stylii, the image may be reduced in size.

For some applications, it may be desirable to copy the image from a particular document and project the image from the transfer medium in a manner similar to motion picture photography. By using the medium which is somewhat transparent which employs magnetic recording material characteristics and placing the image thereon and projecting a beam of light therethrough, the image can then be used much in the manner of projecting a photograph. FIG. 12 shows a portion of a magnetic tape 33 which has a base 33*a* which may be formed of a strong plastic such as a polyester. Situated in the polyester, are small molecules or islands 34 from recording materials such as ferric oxides or Cobalt and Cobalt alloys. These molecules or islands 34 are arranged in the same manner as a lithographers half-tone printing screen and cover approximately 10% of the surface area of the tape 33. In FIG. 12, the upper part of a magnetic image 38 is shown as a strong signal and it is represented by the numeral 35 while a signal which is somewhat weaker produces a less dense magnetic pattern 36 and a very weak signal produces a pattern represented by numeral 37. When the patterns are formed in conjunction with each other, they form a half-tone picture which is generated by moving the transparent magnetic tape across a line of recording heads arranged in a fashion similar to that shown in FIG. 5. It becomes obvious that after dusting the magnetic fine particles on tape 33, that an image is produced which may be projected in a manner similar to ordinary photographic projection techniques. Thus, the magnetic tape 33 would be moved past the stylii in the same manner as the drum and the transfer medium 25 would be disposed of so that the image could be projected directly from the transfer medium.

It should also be evident from the disclosure set forth herein that the contrast between the density of the image being copied and that being reproduced can be adjusted by varying the signal current and thus a very poor image which is to be copied can be made in more detail by making the copied image in a more dense manner. By reducing the current availables to the stylii, the transfer medium may have an image reproduced thereon which is of lighter density than that being copied.

From the foregoing drawings and descriptions it will become clear that a novel method has been shown and described whereby images may be reproduced from smooth surface mediums. It should also be evident that the images may be enlarged or diminished in size from their original size by the arrangement of the stylii without changing the resolution of the fiber optics. It should also be evident that by the use of the present device, and changing the current to produce a different contrast, that a "negative" may be produced from a positive print and the reverse may also be true, that is, a positive print may be reproduced from a "negative." By varying the length of the connecting conductors between the fiber optic sensing heads and the recording stylii, the machine is adaptable for local copying or may be used as a facsimile machine where the image reproducing device is located at a remote station from the scanning device.

Furthermore, because of the copying principles employed, the operator of the machine need not view the copies being reproduced as there is no solution to become weakened as the process moves on and duplicate copies are made.

It will, of course, be understood that various changes may be made in the form, details, arrangement and proportions of the parts without departing from the scope of my invention which consists of the matter shown and described herein and set forth in the appended claims.

I claim:

1. Facsimile apparatus comprising;

(a) a plurality of photosensitive devices adapted to scan an image formed on a smooth surface medium, including electrical signal producing means said photosensitive devices disposed in communicating relationship with such medium and aligned in a row transverse to the direction of movement of such medium;

(b) a drum rotatably mounted and having a homogeneous magnetic recording surface of high retentive magnetic material for receiving and retaining a plurality of magnetic tracks formed therein;

(c) a plurality of single pole recording stylii of low loss magnetic material including electrical signal carrying means aligned radially with respect to said drum and disposed in a row transversly thereto and in spaced relation therefrom to form an air gap and produce a corresponding number of magnetic tracks on said drum;

(d) a plurality of electrical means operably connecting said plurality of photosensitive devices to said corresponding plurality of single pole reading stylii by respectively transmitting and receiving signals representative of such image to be reproduced;

(e) a source of fine magnetic particles disposed in communicating relationship with said drum to form visible images created by said magnetic particles adhering to said plurality of magnetic tracks formed in said magnetic recording surface of said drum;

(f) and guide means disposed in communicating relationship with said drum and adapted to have an image transfer medium pass between said drum and said guide means, said guide means urging such transfer medium into image receiving relationship so that the image on said drum is transferred to such transfer medium when said drum is rotated.

2. The invention as set forth in claim 1 including driving means for moving such smooth surface medium bearing an image to be reproduced past said photosensitive devices, said photosensitive devices being fixedly mounted in non-moving relation with respect to said driving means.

3. The invention as set forth in claim 1 wherein the spacing between said plurality of single pole recording stylii disposed in a row is of a different dimension than the spacing between said plurality of photosensitive devices aligned in a row so that the image transferred to such transfer medium is of a different size than the image formed on such smooth surface medium.

4. The invention as set forth in claim 1 wherein said plurality of electrical means includes;

(a) electrical transmitting means connected to said plurality of photosensitive devices and being located at a first location;

(b) electrical receiving means connected to said plurality of recording stylii and being located at a second location remote from said first location.

5. The invention as set forth in claim 1 including a magnetic particle suspension liquid combined with said magnetic particles to form a solution through which the surface of said drum rotates.

6. Facsimile apparatus comprising:

(a) a plurality of photosensitive devices adapted to scan an image formed on a smooth surface medium, said photosensitive devices disposed in communicating relationship with such medium and aligned in a row transverse to the direction of movement of such medium;

(b) a drum rotatably mounted and having a homogeneous magnetic recording surface of high retentive magnetic material for receiving and retaining a plurality of magnetic tracks formed therein;

(c) a plurality of single pole recording styli of low loss magnetic material aligned radially with respect to said drum and disposed in a row transversely thereto and in spaced relation therefrom to form an air gap and produce a corresponding number of magnetic tracks on said drum;

(d) a plurality of current amplifying devices electrically connected between said plurality of single pole reading styli and the corresponding plurality of photosensitive devices;

(e) a source of visible fine magnetic particles disposed in communicating relationship with said drum to form visible images created by said magnetic particles adhering to said plurality of magnetic tracks formed in said magnetic recording surface of said drum;

(f) and a pressure control device disposed in communicating relationship with said drum and adapted to have an image transfer medium pass between said drum and said pressure control device, said device urging such transfer medium into image receiving relationship so that the image on said drum is transferred to such transfer medium when said drum is rotated.

7. The invention as set forth in claim 6 wherein said photosensitive devices are fiber optic elements formed in cylindrical shape and having (a) a photoresistive coating formed on the outer surface of said element adjacent the end most remote from such image bearing medium;

(b) a reflective coating formed on the outer surface of said element adjacent to the end communicating with such image bearing medium and formed on the end of said element most remote from such image bearing medium, said reflective and photoresistive coatings being separated from each other;

(c) and a pair of electrodes electrically connected to said photoresistive coating to provide electrical connections thereto.

8. The invention as set forth in claim 6 including:

(a) a pair of rollers rotatably mounted and cooperatively engaging each other for rotational movement in opposite directions, said rollers producing movement of such smooth surface medium past said plurality of photosensitive devices when said medium is inserted between said rollers;

(b) and illumination means illuminating such smooth surface medium over an area cooperating with said photosensitive devices so that such images are detectable by said photosensitive devices.

9. The invention as set forth in claim 6 including:

(a) an image transfer medium feeder having means for moving such transfer medium into engagement with said drum and said pressure control device;

(b) magnetic erase means disposed transversely with respect to said drum in spaced relation therefrom to form an air gap therewith and thereby erase said magnetic tracks formed on said drum when so desired;

(c) and brush means communicating with said drum and disposed circumferentially away from said magnetic erase means in the direction of rotation of said drum for wiping any of said magnetic particles from said drum after said drum is demagnetized.

10. Facsimile apparatus comprising:

(a) a plurality of photosensitive devices adapted to scan an image formed on a smooth surface medium, said photosensitive devices disposed in communicating relationship with such medium and aligned in a row transverse to the direction of movement of such medium;

(b) a substantially transparent magnetic recording medium having its total surface area partially covered with a symmetrical pattern of retentive magnetic material;

(c) driving means for moving said recording medium in substantially one direction;

(d) a plurality of single pole recording stylii of low loss magnetic material aligned substantially perpendicular to with respect to the surface area of said magnetic recording medium and disposed in a row transverse to the direction of movement thereof and in spaced relation therefrom to form an air gap and produce a plurality of minute magnetic areas on said recording medium;

(e) and a source of visible fine magnetic particles disposed in communicating relationship with said magnetic recording medium to form visible images created by said magnetic particles adhering to said pattern of retentive magnetic material.

11. The invention as set forth in claim 10 including a liquid magnetic particle suspension liquid combined with said magnetic particles to form a solution through which said recording medium moves.

No references cited.

DAVID G. REDINBAUGH, *Primary Examiner.*

H. W. BRITTON, *Assistant Examiner.*